United States Patent
Spracklen (10) Patent No.: US 10,305,763 B2
(45) Date of Patent: *May 28, 2019

(54) MONITORING AUDIO FIDELITY AND AUDIO-VIDEO SYNCHRONIZATION

(71) Applicant: VMware, Inc., Palo Alto, CA (US)

(72) Inventor: Lawrence Andrew Spracklen, Boulder Creek, CA (US)

(73) Assignee: VMware, Inc., Palo Alto, CA (US)

(*) Notice: Subject to any disclaimer, the term of this patent is extended or adjusted under 35 U.S.C. 154(b) by 400 days.

This patent is subject to a terminal disclaimer.

(21) Appl. No.: 14/336,835

(22) Filed: Jul. 21, 2014

(65) Prior Publication Data

US 2014/0328203 A1 Nov. 6, 2014

Related U.S. Application Data

(63) Continuation of application No. 12/942,393, filed on Nov. 9, 2010, now Pat. No. 8,788,079.

(51) Int. Cl.
*H04L 7/04* (2006.01)
*H04L 12/26* (2006.01)
(Continued)

(52) U.S. Cl.
CPC .............. *H04L 43/08* (2013.01); *H04L 7/043* (2013.01); *H04N 17/004* (2013.01);
(Continued)

(58) Field of Classification Search
CPC ....... H04L 65/80; H04L 65/608; H04L 47/10; H04L 43/106; H04N 21/2402;
(Continued)

(56) References Cited

U.S. PATENT DOCUMENTS 5,642,171 A 6/1997 Baumgartner et al.
5,815,572 A 9/1998 Hobbs
(Continued)

OTHER PUBLICATIONS

"Port Forwarding." Wikipedia. Published Feb. 15, 2010. Retrieved prior to Oct. 25, 2013. Retrieved from the internet, Retrieved URL<http://web.archive.org/web/20100215085655/http://en.wikipedia.org/Port_forwarding>. 3 pages.
(Continued)

*Primary Examiner* — Duc Nguyen
*Assistant Examiner* — Alexander L Eljaiek
(74) *Attorney, Agent, or Firm* — Fish & Richardson P.C.

(57) ABSTRACT

Methods, systems, and computer programs for monitoring quality of audio delivered over a communications channel are presented. One method includes an operation for defining timestamps. The timestamps are associated with a measure of time while delivering audio to a client computer, where each timestamp includes a plurality of timestamp bits. Further, the method includes an operation for modulating an audio signal with pseudo noise (PN) codes when a timestamp bit has a first logical value, and modulating the audio signal with a negative of the PN codes when the timestamp bit has a second logical value. After transmitting the modulated audio signal to the client computer, the timestamp bits are extracted from a received modulated audio signal to obtain received timestamps. The quality of the audio is assessed based on the received timestamps, and the quality of the audio is stored in computer memory.

22 Claims, 8 Drawing Sheets

(51) Int. Cl.
*H04N 17/00* (2006.01)
*H04R 27/00* (2006.01)

(52) U.S. Cl.
CPC ....... *H04R 27/00* (2013.01); *H04R 2227/003* (2013.01); *H04R 2227/005* (2013.01)

(58) Field of Classification Search
CPC ..... H04W 28/24; H04W 24/08; H04W 24/00; G06F 2209/5016; G06F 2209/508; G06F 9/45533
USPC ....... 709/224, 231, 223, 203, 217, 219, 230, 709/232; 713/400; 700/94
See application file for complete search history.

(56) References Cited

U.S. PATENT DOCUMENTS

| | | |
|---|---|---|
| 5,933,155 A | 8/1999 | Akeley |
| 6,168,431 B1 | 1/2001 | Narusawa et al. |
| 6,381,362 B1 | 4/2002 | Deshpande et al. |
| 6,421,678 B2 | 7/2002 | Smiga et al. |
| 6,618,431 B1 | 9/2003 | Lee |
| 6,876,390 B1 | 4/2005 | Nagata |
| 7,155,681 B2 | 12/2006 | Mansour et al. |
| 7,287,180 B1 | 10/2007 | Chen et al. |
| 7,287,275 B2 | 10/2007 | Moskowitz |
| 7,532,642 B1 | 5/2009 | Peacock |
| 7,552,467 B2 | 6/2009 | Lindsay |
| 7,593,543 B1 | 9/2009 | Herz et al. |
| 7,752,325 B1 | 7/2010 | Yadav et al. |
| 7,796,978 B2 | 9/2010 | Jones et al. |
| 7,831,661 B2 | 11/2010 | Makhija et al. |
| 8,166,107 B2 | 4/2012 | Makhija |
| 8,347,344 B2 | 1/2013 | Makhija et al. |
| 8,788,079 B2 * | 7/2014 | Spracklen ............ H04N 17/004 700/94 |
| 9,214,004 B2 | 12/2015 | Agrawal et al. |
| 9,471,951 B2 | 10/2016 | Agrawal et al. |
| 9,578,373 B2 | 2/2017 | Agrawal et al. |
| 9,674,562 B1 | 6/2017 | Spracklen et al. |
| 2001/0023436 A1 | 9/2001 | Srinivasan et al. |
| 2002/0026505 A1 | 2/2002 | Terry |
| 2002/0056129 A1 | 5/2002 | Blackketter et al. |
| 2002/0138846 A1 | 9/2002 | Mizutani et al. |
| 2002/0165757 A1 | 11/2002 | Lisser |
| 2004/0022453 A1 | 2/2004 | Kusama et al. |
| 2004/0073947 A1 | 4/2004 | Gupta |
| 2004/0137929 A1 * | 7/2004 | Jones ................. H04N 21/6582 455/517 |
| 2004/0184526 A1 | 9/2004 | Penttila et al. |
| 2004/0221315 A1 | 11/2004 | Kobayashi |
| 2005/0041136 A1 | 2/2005 | Miyata |
| 2005/0138136 A1 | 6/2005 | Potter |
| 2005/0187950 A1 | 8/2005 | Parker et al. |
| 2005/0234715 A1 | 10/2005 | Ozawa |
| 2005/0283800 A1 | 12/2005 | Ellis et al. |
| 2006/0050640 A1 | 3/2006 | Jin et al. |
| 2006/0059095 A1 * | 3/2006 | Akins, III ............ G11B 27/034 705/51 |
| 2006/0206491 A1 | 9/2006 | Sakamoto et al. |
| 2007/0003102 A1 | 1/2007 | Fujii et al. |
| 2007/0008108 A1 | 1/2007 | Schurig |
| 2007/0125862 A1 | 6/2007 | Uchiyama et al. |
| 2007/0126929 A1 | 6/2007 | Han et al. |
| 2007/0250920 A1 | 10/2007 | Lindsay |
| 2007/0260870 A1 | 11/2007 | Nissan et al. |
| 2007/0271375 A1 | 11/2007 | Hwang |
| 2007/0291771 A1 | 12/2007 | Cline |
| 2008/0022350 A1 | 1/2008 | Hostyn et al. |
| 2008/0052783 A1 | 2/2008 | Levy |
| 2008/0070589 A1 | 3/2008 | Hansen et al. |
| 2008/0075121 A1 | 3/2008 | Fourcard |
| 2008/0112490 A1 | 5/2008 | Kamijo et al. |
| 2008/0117937 A1 | 5/2008 | Firestone et al. |
| 2008/0204600 A1 | 8/2008 | Xu et al. |
| 2008/0212557 A1 | 9/2008 | Chiricescu et al. |
| 2008/0263634 A1 | 10/2008 | Kirkland |
| 2008/0297603 A1 | 12/2008 | Hurst |
| 2008/0310368 A1 | 12/2008 | Fischer |
| 2009/0100164 A1 | 4/2009 | Skvortsov et al. |
| 2009/0210747 A1 | 8/2009 | Boone |
| 2009/0216975 A1 | 8/2009 | Halperin et al. |
| 2009/0217052 A1 * | 8/2009 | Baudry ................. G06T 1/0085 713/178 |
| 2009/0259941 A1 | 10/2009 | Kennedy, Jr. |
| 2009/0260045 A1 | 10/2009 | Karlsson et al. |
| 2009/0268709 A1 | 10/2009 | Yu |
| 2010/0047211 A1 | 2/2010 | Mcniece |
| 2010/0161711 A1 | 6/2010 | Makhija et al. |
| 2010/0162338 A1 | 6/2010 | Makhija |
| 2010/0246810 A1 | 9/2010 | Srinivasan et al. |
| 2010/0306163 A1 | 12/2010 | Beaty et al. |
| 2011/0023691 A1 | 2/2011 | Iwase et al. |
| 2011/0051804 A1 | 3/2011 | Chou et al. |
| 2011/0078532 A1 | 3/2011 | Vonog |
| 2011/0103468 A1 * | 5/2011 | Polisetty ................. G10L 25/78 375/240.03 |
| 2011/0134763 A1 | 6/2011 | Medina et al. |
| 2011/0138314 A1 | 6/2011 | Mir et al. |
| 2011/0179136 A1 | 7/2011 | Twitchell, Jr. |
| 2011/0188704 A1 | 8/2011 | Radhakrishnan et al. |
| 2011/0224811 A1 | 9/2011 | Lauwers et al. |
| 2011/0238789 A1 | 9/2011 | Luby et al. |
| 2012/0036251 A1 | 2/2012 | Beaty et al. |
| 2012/0066711 A1 | 3/2012 | Evans et al. |
| 2012/0073344 A1 | 3/2012 | Fabris |
| 2012/0081580 A1 | 4/2012 | Cote et al. |
| 2012/0113270 A1 | 5/2012 | Spracklen |
| 2012/0140935 A1 | 6/2012 | Kruglick |
| 2012/0167145 A1 | 6/2012 | Incorvia |
| 2012/0246225 A1 | 9/2012 | Lemire |
| 2013/0097426 A1 | 4/2013 | Agrawal et al. |
| 2014/0320673 A1 | 10/2014 | Agrawal et al. |
| 2014/0325054 A1 | 10/2014 | Agrawal et al. |
| 2016/0098810 A1 | 4/2016 | Agrawal et al. |
| 2017/0011486 A1 | 1/2017 | Agrawal et al. |

OTHER PUBLICATIONS

Larsen, Vegard. Combining Audio Fingerprints. Norwegian University of Science and Technology. Department of Computer and Information Science. 2008. 151 pages.

Mathematics Stack Exchange [online]. "Orthogonal Binary Sequences," Aug. 2015, [retrieved on Mar. 6, 2018]. Retrieved from the Internet URL<https://math.stackexchange.com/questions/1412903/orthogonal-binary-sequences>. 1 page.

* cited by examiner

MONITORING AUDIO FIDELITY AND AUDIO-VIDEO SYNCHRONIZATION

CROSS REFERENCE TO RELATED APPLICATIONS

This application is a continuation application of, and claims priority to, U.S. patent application Ser. No. 12/942,393, filed on Nov. 9, 2010, and which is incorporated here by reference.

This application is related to U.S. Pat. No. 7,831,661, issued Nov. 9, 2010, and entitled "MEASURING CLIENT INTERACTIVE PERFORMANCE USING A DISPLAY CHANNEL"; and U.S. application Ser. No. 12/337,895, filed on Dec. 18, 2008, and entitled "MEASURING REMOTE VIDEO PLAYBACK PERFORMANCE WITH EMBEDDED ENCODED PIXELS", which are incorporated herein by reference.

FIELD OF THE INVENTION

The present invention relates to methods and systems for measuring performance of remote display and playback, and more particularly, methods and systems for measuring performance of remote display and playback in a virtual desktop environment.

DESCRIPTION OF THE RELATED ART

In a typical virtualized desktop infrastructure architecture, user displays and input devices are local, but applications execute remotely in a server. Because applications are executing remotely, a latency element is introduced due to network travel time and application response time. One method of assessing the performance of remote applications is by measuring the response times for various events. These response times are the result of aggregating latency across different components in the architecture. Measuring these latencies, however, is a challenge as measurements must encompass latencies related to both the low level events (such as mouse movements) and the high level events (application launches), as well as work across network boundaries and a range of client devices.

Virtual Desktop Infrastructure (VDI) deployments are rapidly becoming popular. In VDI deployments, a user's desktop is typically hosted in a datacenter or cloud, and the user remotely interacts with her desktop via a variety of endpoint devices, including desktops, laptops, thin clients, smart phones, tablets, etc. There is a wide variety of advantages to leveraging this approach, including cost savings, improved mobility, etc. However, for these VDI environments to become ubiquitous, the user should not be constrained in the type of applications that can be successfully run. Accordingly, it is necessary to ensure that, when required, sufficient computational resources can be made available in the data center and that, without comprising quality, there is sufficient network bandwidth to transmit the desired imagery and audio to the user's endpoint device. In order to ensure proper quality of delivery, it is necessary to automatically monitor audio quality and the synchronization of audio and video.

SUMMARY

Embodiments of the present invention provide methods, systems, and computer programs for monitoring quality of audio delivered over a communications channel. It should be appreciated that the present invention can be implemented in numerous ways, such as a process, an apparatus, a system, a device or a method on a computer readable medium. Several inventive embodiments of the present invention are described below.

In one embodiment, a method includes an operation for defining timestamps. The timestamps are associated with a measure of time while delivering audio to a client computer, where each timestamp includes a plurality of timestamp bits. Further, the method includes an operation for modulating an audio signal with pseudo noise (PN) codes when a timestamp bit has a first logical value, and modulating the audio signal with a negative of the PN codes when the timestamp bit has a second logical value. After transmitting the modulated audio signal to the client computer, the timestamp bits are extracted from a received modulated audio signal to obtain received timestamps. The quality of the audio is assessed based on the received timestamps, and the quality of the audio is stored in computer memory.

In another embodiment, a system for monitoring quality of audio delivered over a communications channel includes a performance manager in a server computer and a performance agent in a client computer. The server computer holds an audio signal, and the performance manager defines timestamps that are associated with a measure of time while delivering audio to the client computer. Each timestamp includes a plurality of timestamp bits, and the performance manager modulates an audio signal with PN codes when a timestamp bit has a first logical value and modulates the audio signal with a negative of the PN codes when the timestamp bit has a second logical value. The performance agent extracts the timestamp bits from a received modulated audio signal from the server computer and obtains received timestamps. Further, the performance agent assesses a quality of the audio based on the received timestamps and stores the quality of the audio in computer memory.

In yet another embodiment, a computer program embedded in a non-transitory computer-readable storage medium, when executed by one or more processors, for monitoring quality of audio delivered over a communications channel, includes program instructions for defining timestamps, which are associated with a measure of time while delivering audio to a client computer. Each timestamp includes a plurality of timestamp bits. The computer program further includes program instructions for modulating an audio signal with PN codes when a timestamp bit has a first logical value, and for modulating the audio signal with a negative of the PN codes when the timestamp bit has a second logical value. Additional program instructions are used for transmitting the modulated audio signal to the client computer, and for extracting the timestamp bits from a received modulated audio signal to obtain received timestamps. In addition, the computer program includes program instructions for assessing a quality of the audio based on the received timestamps, and for storing the quality of the audio in computer memory.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings in which.

DETAILED DESCRIPTION

In Virtual Desktop Infrastructure (VDI) deployments there is a need to ensure that the user has a good audio and visual experience, even when running the most demanding of applications in the most challenging situations. There is a desire to automatically monitor audio quality and audio-video synchronization in the benchmark and capacity planning environments.

Embodiments of the invention present techniques to use spread-spectrum communications to introduce hardened timestamps into audio streams in the VDI environment, as a way to provide real-time feedback on audio quality and audio-video synchronization. Further, embodiments of the invention overcome many additional challenges that are particular to the VDI environment to achieve high information bit rates in the low bit rate audio environments. It should be noted that some embodiments are presented within a VDI environment, but the principles of the invention can be used for other types of deployments and other communications channels using analog or digital signals. The embodiments illustrated herein should therefore not be interpreted to be exclusive or limiting, but rather exemplary or illustrative.

It will be obvious, however, to one skilled in the art, that the present invention may be practiced without some or all of these specific details. In other instances, well known process operations have not been described in detail in order not to unnecessarily obscure the present invention.

Figure 1:
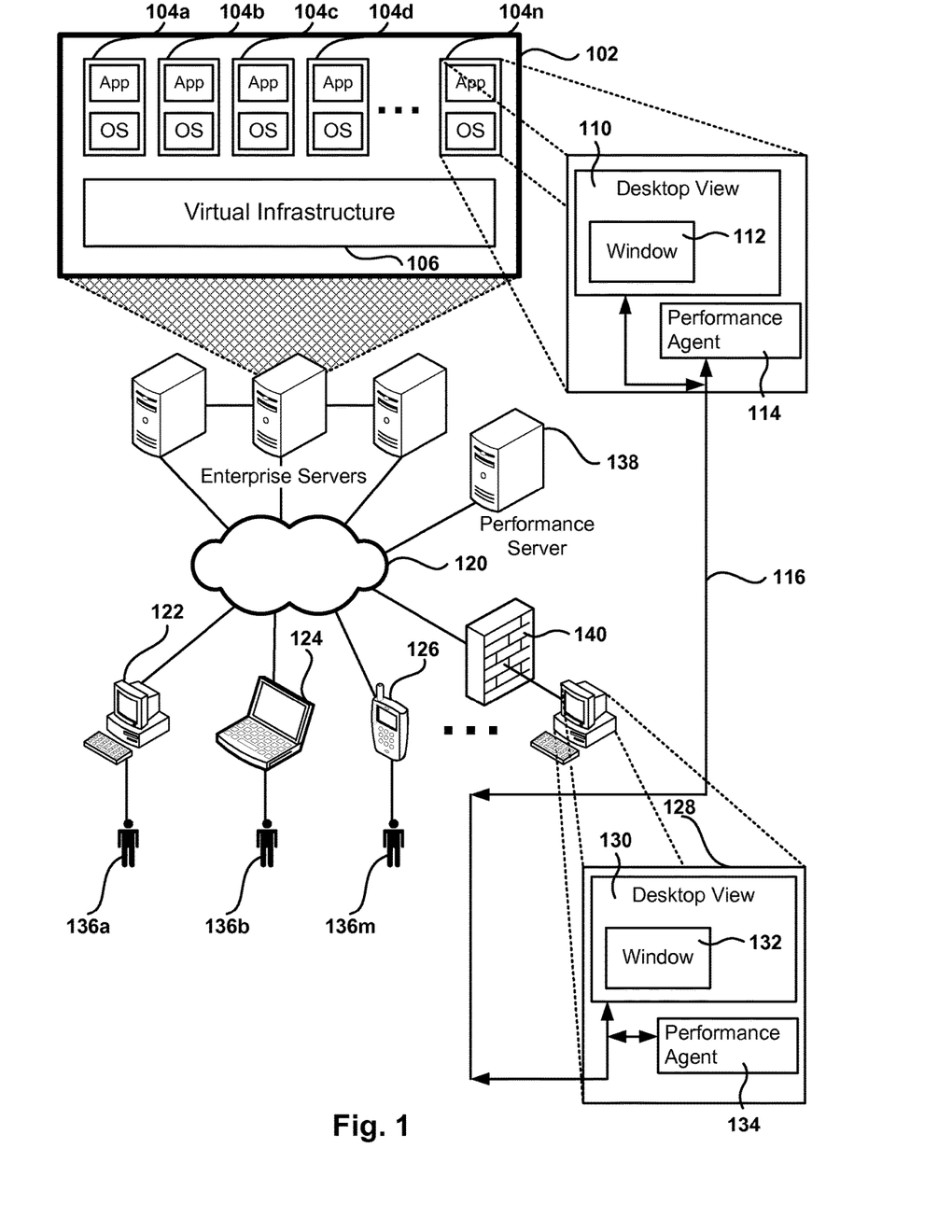
FIG. 1 depicts a remote desktop environment including virtual machine servers, according to one embodiment.

FIG. 1 depicts a remote desktop environment including virtual machine servers, according to one embodiment. The environment depicted in FIG. 1 includes enterprise servers 102 that provide virtual desktop services to remote users 136a-m. Although embodiments of the present invention are described within a virtual desktop system, the embodiments presented can be used in other environments with a remote application transmitting audio or video data to a remote client.

In one embodiment, performance server 138 is also part of virtualization server 102. Performance server 138 collects performance data from servers and clients and analyzes the data collected for presentation to a user. A simplified architecture of virtualization server 102 is shown in FIG. 1, with some components omitted for simplification purposes. Virtual infrastructure layer 106 manages the assignment of virtual machines (VM) 104a-n in enterprise server 102 to remote users. Remote users 136a-m are connected to computers 122, 124 and 126 acting as clients in the virtual infrastructure. Computers 122, 124 and 126 provide display presentation and input/output capabilities associated with virtual machines 104a-n. Clients include personal computer (PC) 122, laptop 124, Personal Digital Assistant (PDA), mobile phone 126, etc. Clients communicate with virtualization server 102 via network 120.

Virtual machines 104a-n include a Guest Operating System (GOS) supporting applications running on the GOS. A different view of virtual machine 104n includes desktop view 110, windows-based user interface 112, and performance agent 114. Performance Agent 114 is a process executing in the VM that monitors the quality of video and audio delivered to the client. On the other end, a local client 128 includes display 130, remote desktop client 132 and performance agent 134. Desktop view 110 corresponds to the desktop view 130 for the virtual machine, which includes windows-based user interface 132.

Performance agent 134 cooperates with performance agent 114 for the collection of audio and video quality metrics. Embodiments of the invention measure the performance of the virtual environment as seen by users 136a-m, even in the presence of firewalls 140 that may block out-of-band communications. The embodiments presented are independent of the communications protocols used to transfer display data, thus being able to reliably obtained performance measurements under different topologies and protocols and assess how different factors affect virtual desktop performance. Further still, the methods presented can scale to tens of thousands of clients and servers without unduly burdening the virtual infrastructure.

Figure 2:
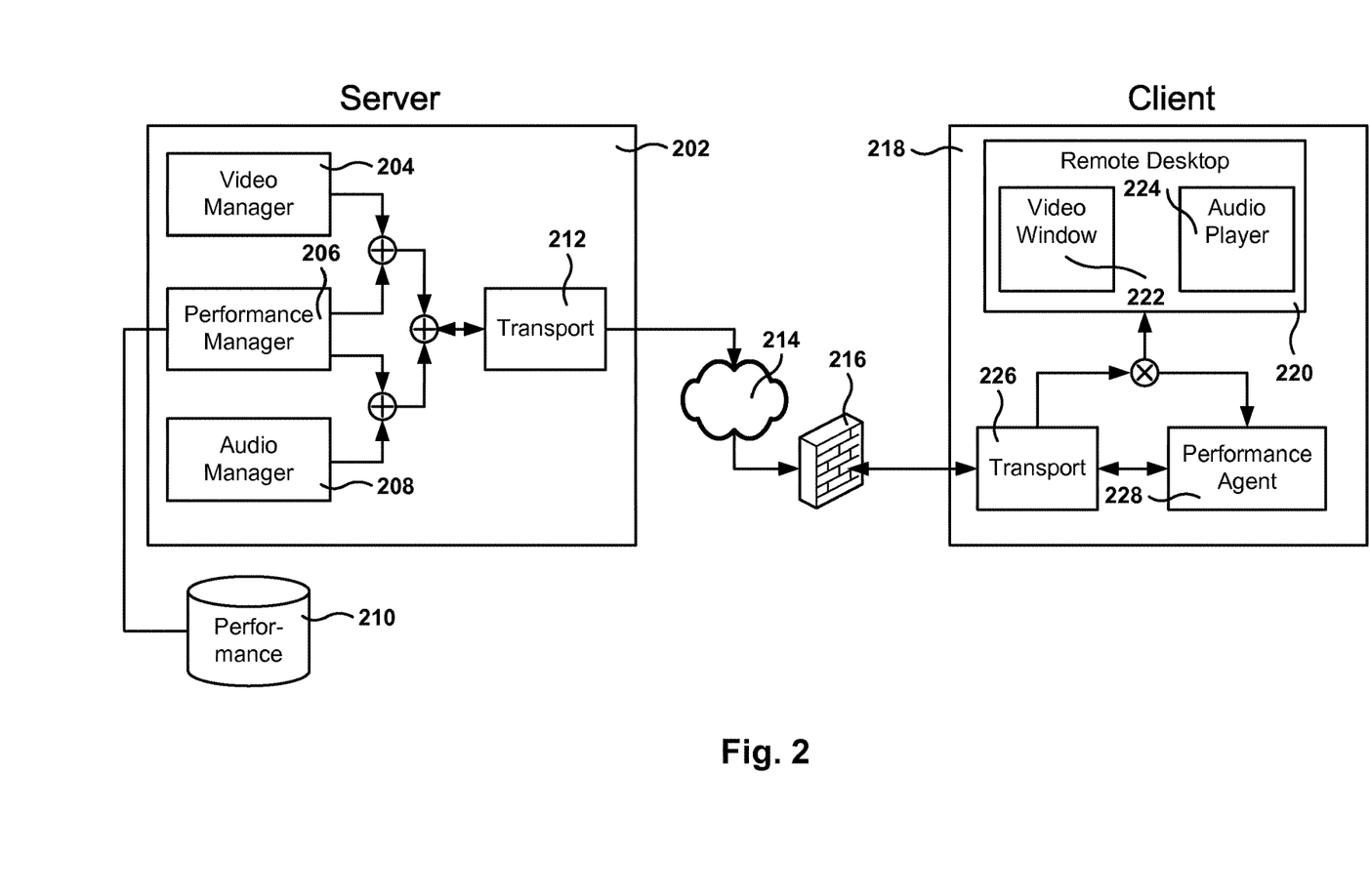
FIG. 2 illustrates the embedding of information in transmitted audio and video data to measure performance, according to one embodiment.

FIG. 2 illustrates the embedding of information in transmitted audio and video data to measure performance, according to one embodiment. In the VDI environment, applications such as high definition (HD) video, webcasts, and video conferences can consume significant CPU and network bandwidth. In many instances, the lack of resources can result in a sub-optimal experience for end-users. Focusing on audio delivery, quality not only means ensuring that the audio fidelity remains acceptable, but that the audio playback remains closely synchronized with the video stream with which it is associated. In many VDI protocols, there is no tethering between the audio and the video streams, so noticeable lack of synchronization is possible. To ensure that these undesirable events are not encountered in a VDI deployment, attention needs to be paid to the provisioning within the datacenter. In addition, the VDI transport protocols, used to convey the display images and audio to the endpoint, have to be carefully tailored to ensure that quality degrades gradually when CPU or network bandwidth constraints are encountered. While methodologies have been developed to analyze video performance (in terms of frame rates), tracking audio remains a challenge, because automatically tracking the audio fidelity and audio-video synchronization in a system with potentially thousands of simulated users requires a large amount of resources and measurements.

To accurately measure audio fidelity, as perceived on the endpoint device, it is necessary to examine the audio stream received by the endpoint, and ascertain firstly, how closely does the received stream match the 'original' audio stream, and secondly, how a user would perceive the differences. If a user is sitting at her desktop and listening to the audio stream locally, how does that experience compare with the experience in the VDI environment? The following factors can have an impact on audio or video delivery:

CPU constraints on the host, which can impact how fast the audio can be decoded and readied for sending to the endpoint device;

Network constraints, which can result in loss or delay of data; and

Lossy compression in the transport protocol, which reduces network bandwidth consumption. For example, the audio can be compressed by the VDI transport protocol (e.g., PCoIP, RDP) and impact the audio quality. The lossy compression techniques can include standard compression techniques such as Adaptive Differential Pulse-Code Modulation (ADPCM,) or more intrusive techniques such as down sampling.

At first glance, it may simply seem necessary to capture the audio stream on the endpoint device (as it is being sent to the speakers) and then compare it with the original stream. Unfortunately, given the alterations that can occur to the stream in the VDI environment (a result of the host CPU, network and compression issues discussed above), this analysis can rapidly become computationally challenging, especially on resource constrained end-point devices. Embodiments of the invention use timing markers within audio streams to simplify this matching process. During benchmarking and provisioning, there is offline access to the audio and video streams that will be played during testing. Accordingly, it is feasible to modify the original audio and video files to include these markers. By doing so, the markers provide end-to-end timing protection. Further, it is potentially acceptable to perturb the audio stream by the marker insertion during testing because it is not a live deployment where users are actually listening to the streams. However, it should be noted that the principles of the invention can also be used in live deployments by making the markers introduce a small amount of noise which is not noticed by users, or offers only a small amount of perceived noise.

It should be noted that the architecture shown in FIG. 2 is used for estimating audio and video performance on real-world deployments, although the same architecture can also be used in testing environments. Server 202 has access to the audio or video to be delivered to client 218. The media can reside in a storage device attached to server 202, or can be downloaded from a media server. Video manager 204 prepares the video for delivery to the remote client 218, and audio manager 208 prepares the audio for delivery. In some environments, the video and the audio manager reside in the same process, and in other environments, they can be implemented by separate programs or processes.

Performance manager 206 intercepts the audio or video signal before is sent out to transport module 212 and adds information to the audio or video signal for performing quality measurements, as described below in more detail with reference to FIGS. 3 and 4. Performance manager uses wall-clock timing (i.e., actual time progress) to ensure that video manager 204 and audio manager 208 generate data at appropriate rates, for example to make sure that audio and video are synchronized or that the audio signal transmitted is for audio that will play at the appropriate speed at the client. In one embodiment, the functions of performance manager 206 are incorporated into video manager 204 or audio manager 208 (e.g., by the use of a plugin), which allows a tighter integration of the performance tracking with the actual decoding/playback of the audio or video. Transport module 212 delivers the signal through network 214 to the remote client 218. In some cases, the signal has to go through a firewall 216. By incorporating the performance markers within the audio signal, the performance markers are not blocked by firewall 216, which could be the case if out-of-band information were sent separate from the audio or video signal.

In one embodiment, such as in a test environment, the timestamps are introduced into the audio or video files in advance (offline) and performance manager 206 does not need to intercept or modify the outgoing audio or video streams. Client 218 includes remote desktop environment 220, transport module 226, and performance agent 228. The remote desktop environment provides a user interface, which typically includes a windows environment with video window 222 and audio player 224. The video window 222 delivers videos to the user, and the audio player delivers audio to the user. The signal sent from transport 212 in server 202 via network 214 is received by transport module 226 at client 218. The signal is then processed by the audio or video player to deliver audio or video to the user. The signal is also examined by performance agent 228 to extract the information embedded by performance manager 206 at the server.

Once the information is extracted by performance agent 228, this information is used to compute quality metrics that measure the quality of delivery. More details on the calculation of quality metrics are given below with reference to FIGS. 5A-5B and 6A-6C. Performance manager 206 and performance agent 228 cooperate in the computation of these metrics, which can be performed by either one of them. The performance measurements and the quality metrics are available for display to a user or system administrator, and in one embodiment the performance measurements and the quality metrics are stored in performance database 210.

Figure 3:
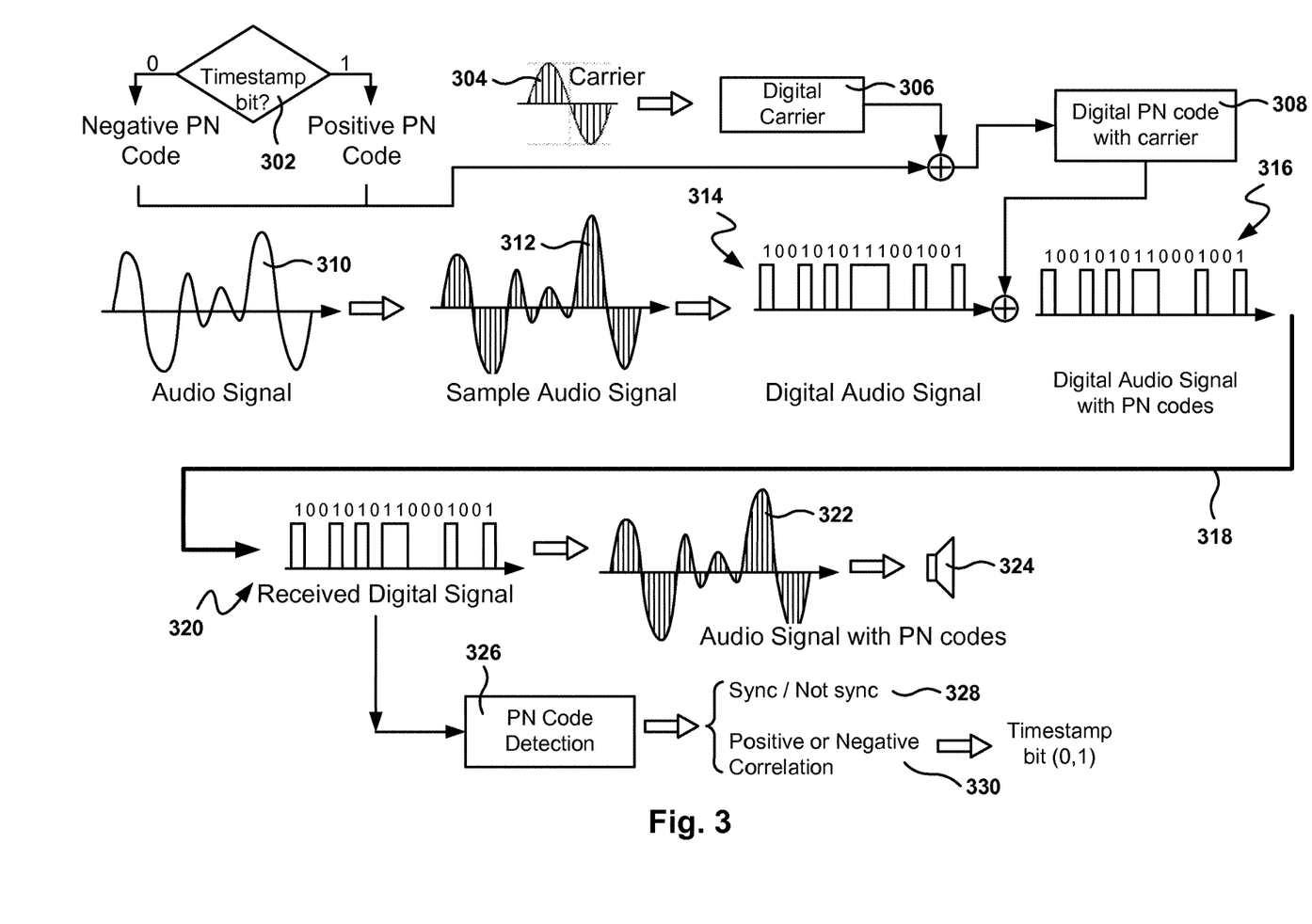
FIG. 3 illustrates the process of inserting and extracting pseudo noise (PN) codes in a spread spectrum transmission environment, according to one embodiment.

FIG. 3 illustrates the process of inserting and extracting pseudo noise (PN) codes in a spread spectrum transmission environment, according to one embodiment. In the operational environment with active users, if an administrator desires to keep real-time track of the users' experience, it is possible to run a small application on the host that inserted markers into the host's output audio stream. In this scenario, there would have to be minimal perturbation to the original audio stream by the insertion of the markers. The advantage of this approach is that the administrator can use this real-time quality information to identify and remedy problems before the user is inconvenienced and has to file a complaint.

A simple method to measure audio quality is to periodically insert samples or markers in the audio stream before transmission to the endpoint device, and then simply locate the markers on the endpoint device. This provides a measure of how fast the audio stream is progressing, and if the inserted markers are being received correctly. However, the modifications incurred by the audio stream during transmission make it difficult, if not impossible, to accurately recover these timing markers. It is necessary to "harden" the markers, such that the markers are more resilient to any modifications incurred during transit.

In order to enable audio-video synchronization at a necessary granularity (e.g., 100 ms,) it is not sufficient to insert infrequent periodic markers every second or so. For a typical (e.g., 44.1 KHz) audio stream, it is necessary to be able to detect alignment within 4500 samples. Further, to prevent the introduction of aliasing (e.g., from jitter or replication) it is not sufficient to insert a simple marker every 4500 samples. Rather, each marker must be uniquely identifiable, at least within a sufficiently large time period to eliminate common aliasing concerns. As a result, there are only 4500 samples available to encode a unique timestamp that can withstand the following sequence of events that can be encountered in the VDI environment: MP3 compression (after offline marker insertion); MP3 decompression; playback via a typical audio tool; compression by the VDI transport protocol; network congestion (e.g., packet loss and jitter;) realization on the endpoint device, etc.

To avoid this problem, timestamps must be hardened. One bit of the timestamp cannot be entrusted to a single bit, or even a single sample, of the audio stream. Rather, it is necessary to spread the timestamp information over multiple samples, such that, even in the presence of the significant modification of the underlying audio stream, the timestamps can be recovered. To achieve this spreading, spread spectrum techniques can be utilized. Spread spectrum signals use special fast codes, often called pseudo-noise (PN) codes, which run at many times the information bandwidth or data rate. The rate of the PN code can range from around 50 times to over 1000 times the information data rate, spreading each bit of information data across multiple bits of the PN code (50 to 1000 bits). The faster the code, the greater the spreading, and the more robust the information encoding is. As each information bit is mapped to a PN code that spans hundreds of audio samples, it is possible for a significant number of audio samples to be missing or corrupted, but the code and the information it carries can still be recovered. The ratio of the code rate to the information bit rate is called the spreading factor or the processing gain.

A spread spectrum (SS) receiver uses a locally generated replica pseudo noise code and a receiver correlator to separate only the desired coded information from all possible signals. A SS correlator can be thought of as a very special matched filter, it responds only to signals that are encoded with a pseudo noise code that matches its own code. Thus, an SS correlator can be tuned to different codes simply by changing its local code. This correlator does not respond to man-made, natural or artificial noise or interference, the correlator responds only to SS signals with identical matched signal characteristics and encoded with the identical pseudo noise code.

The insertion of the timestamps includes an operation for generating a PN code. The timestamps contain a plurality of bits, and each bit is sent separately as a PN code. The timestamp data is used to modulate the k-bit PN code (i.e., the timestamp data is spread.) The k-bit PN code is repeated for the duration of the audio stream. In operation 302, the method checks if the bit being sent is a logical 0 or a logical 1. If it is a logical 0, a negative version of the PN code is used, and if the bit is a logical 1, a positive version of the PN code is used. It is noted that PN codes have the property that the receiver can detect a positive or a negative correlation of the received signal with the PN codes. This property is used to encode a 0 or a 1 bit when using the PN codes. The resulting signal modulates a digital carrier 306, which is obtained by sampling an analog carrier 304, resulting in digital PN code with carrier signal 308.

For example, if a timestamp consists of a sequence of bits 0110 (without using markers, as described below), this timestamp is spread across 4 repeats of the PN code, with each instance of the code being modulated by a successive bit of the timestamp. If the timestamp bit is a 1, an instance of the PN code is emitted, whereas if the timestamp bit is a 0, a negated version of the PN code is emitted. Thus, for the above timestamp, −++− versions of the PN code are generated.

Audio signal 310 is sampled 312 to obtain a digital form of the audio signal 314. The digital PN code with carrier is incorporated into the original digital audio stream 314 to obtain a digital audio signal with PN codes 316, also referred to herein as a modulated audio signal, and then transmitted to the client. At the client, the received digital signal 320 is used for playing audio 322 in speaker 324.

The recovery of the timestamps includes the generation of a PN code that matches the PN code used during the generation of the modified audio stream. PN code detection module 326 at the receiver acquires the received code and locks to the received code. The PN code detection module 326 compares its copy of the PN code against the received digital stream. When an unmodified version of the PN code is observed, the receiver knows that a 1 was transmitted, whereas if a negated version is observed, then a 0 was transmitted. By repeating this process for successive timestamp bits, the receiver gradually recreates the transmitted timestamp by concatenating the received timestamp bits.

The timestamp bit detection is performed by undertaking a correlation operation, where the received stream is correlated against the known PN code. These special PN codes have a critical property, the periodic autocorrelation function has a peak at 0 shift and a value of 0 elsewhere, i.e., there is a significant spike in correlation when the two codes are precisely aligned. A misalignment of the codes, by as little as a single sample, results in a significantly diminished degree of correlation. Accordingly, to locate a PN code in the received stream, the receiver needs to gradually advance its PN code across the received stream and recalculate the correlation after each sample-by-sample move. When the correlation exceeds a predefined threshold, the code in the audio stream has been located or acquired. Alternatively, rather than using a preset threshold, the code can be moved across a predefined window of the audio stream and the maximum correlation observed deemed to represent the location of the code.

Once the code has been locked, the receiver can proceed across the audio stream, determine where a positive or negative version of the code was transmitted (indicated by whether the result of the correlation operation is positive or negative), and recover the timestamp bits that can then be used to determine how far the audio stream has advanced and whether it is synchronized with the corresponding video sequence. If the correlation is positive, the system determines that a timestamp bit with a value of 1 has been received, and a bit with a value of 0 otherwise. A plurality of timestamps bits are combined to form a timestamp, as described below in more detail with reference to FIG. 4. In another embodiment, the encoding of the timestamp bit alternates. For example, a logic 1 is encoded with a positive version of the PN code in a first bit, and a logic 1 is encoded with a negative version of the PN code in the encoding of the bit following the first bit.

Figure 4:
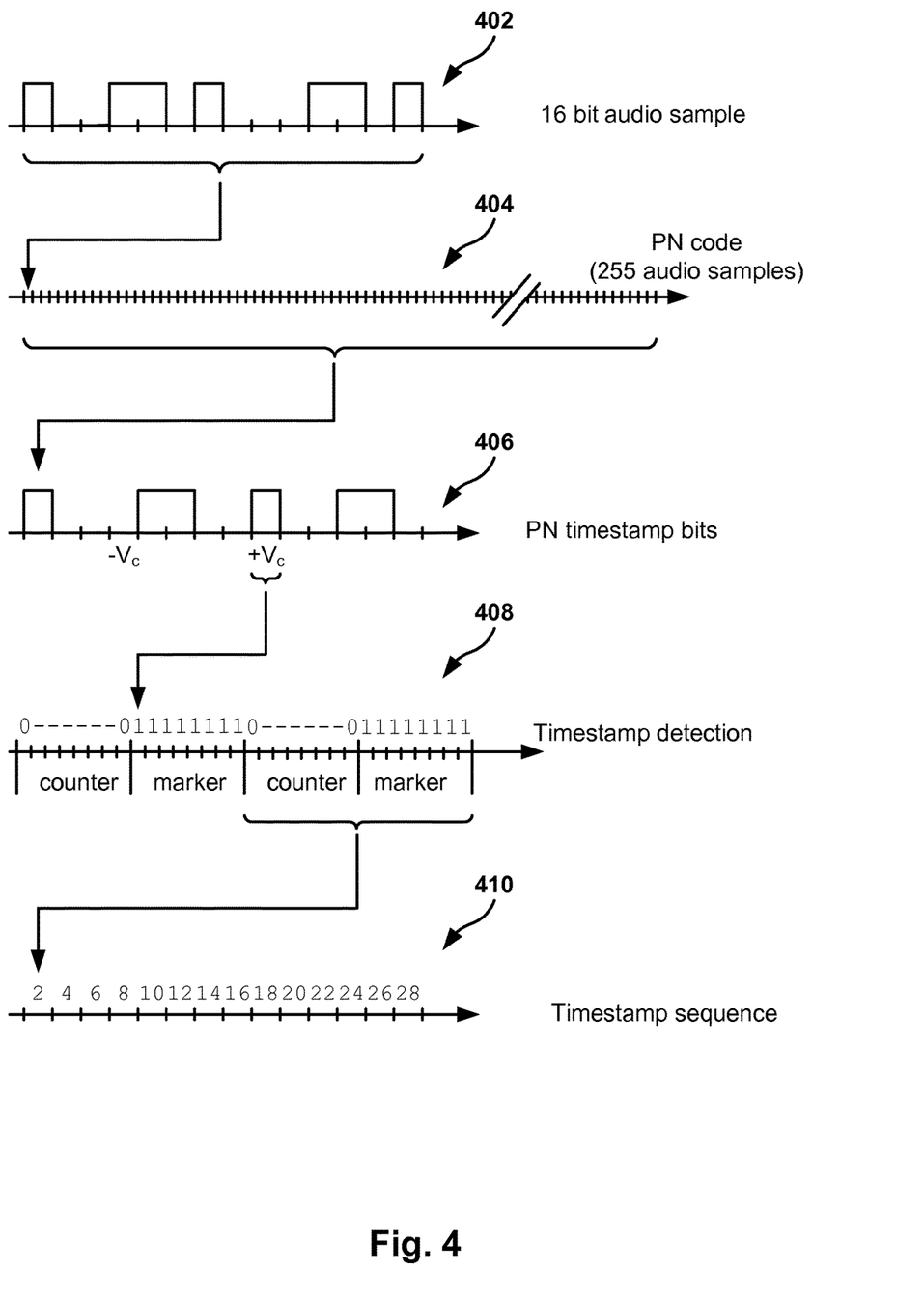
FIG. 4 depicts an embodiment for encoding timestamps using PN codes.

It should be noted that the embodiments illustrated in FIG. 4 are exemplary methods for inserting PN codes in a signal. Other embodiments may utilize different timestamps, encode 1 bits with the negative version of the PN code, use PN codes that are more or less "spread", modulate signals in the analog or digital domain, etc. The embodiments illustrated herein should therefore not be interpreted to be exclusive or limiting, but rather exemplary or illustrative. In addition, embodiments of the invention are presented here with reference to audio signals, but the same principles can be used to embed markers in video signals. In other embodiments, the audio time-stamping can be combined with other video measuring techniques, such as the ones described in U.S. Pat. No. 7,831,661, issued Nov. 9, 2010, and entitled "MEASURING CLIENT INTERACTIVE PERFORMANCE USING A DISPLAY CHANNEL", and U.S. application Ser. No. 12/337,895, filed on Dec. 18, 2008, and entitled "MEASURING REMOTE VIDEO PLAYBACK PERFORMANCE WITH EMBEDDED ENCODED PIXELS", which are incorporated herein by reference.

FIG. 4 depicts an embodiment for encoding timestamps using PN codes. Each audio sample 402 includes 16 bits, each of the PN codes 404 is spread across 255 of the 16-bit audio samples, and each of the bits in the timestamp 406 is encoded in one of the PN codes. As previously described, a 1 bit is encoded as the positive version of the PN code, and a 0 bit is encoded as the negative version of the PN code, although the encoding is reversed in another embodiment.

Timestamp bits 406 are combined to form timestamp 408. In the embodiment shown in FIG. 4, each timestamp includes a counter and a marker. It should be noted, that sometimes the counter is referred to as the timestamp for simplicity of description purposes as the marker is only used for the detection of the value of the counter, which is associated with the value of the timestamp. In the example of FIG. 4, the marker includes a plurality of bits with a logical value of 1. The counter also includes eight bits that provide a numerical value for the count, with the first and last bits in the counter constant at logical 0. As timestamps are sequentially detected, a sequence 410 of timestamps is obtained at the client.

Finding the timestamps in the incoming stream of timestamp bits starts by determining where each timestamp starts and ends. The received sequence may contain, replicated bits, missing bits, or corrupted bits. As a result, it is not possible to simply divide the bit stream into chunks of a fixed number of bits and consider each chunk a timestamp. Rather, it is necessary to use a unique symbol in the audio stream to demarcate each timestamp. For instance, if the timestamp is 8-bit long and if the time data is constrained such that bits 0 and 7 are always zero, then a sequence of 8 1s could be used to demarcate and detect each timestamp.

One of the challenges in measuring quality is inserting a sufficiently large timestamp fast enough to provide the high resolution timing required for valuable measurements. For instance, if each PN sequence spans 255 samples and each timestamp is 8 bits, 2040 timestamps are required for each timestamp. If a maximum of 4500 samples is used per timestamp and an 8-bit demarcation marker is added to each timestamp, where the sample count is up to 4080, there is little additional room for error correction (EC) codes. If the PN code length is reduced for a shorter code, then there is less spreading and less immunity to audio stream modification. In experimentation, 255-bit Kasami codes were found to provide sufficient protection to handle the conditions encountered in the VDI environment (127-bit codes were found to be too short). Alternatively, the interval between demarcation markers could be increased, reducing their overhead, although this increases the complexity of recovering the timestamps.

It should be noted that the embodiments illustrated in FIG. 4 are exemplary ways to insert demarcation markers and recover the timestamps. Other embodiments may utilize different markers, timestamps, sizes of the timestamp, frequencies of the timestamp, etc. The embodiments illustrated herein should therefore not be interpreted to be exclusive or limiting, but rather exemplary or illustrative.

Figure 5A:
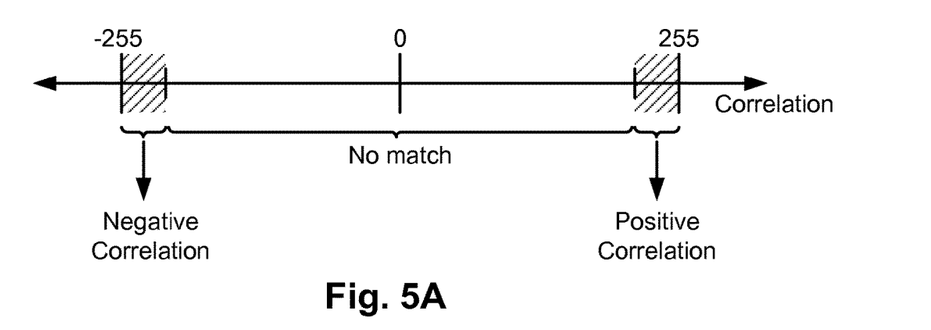
FIGS. 5A and 5B illustrate the measurements associated with the correlation of PN codes, according to one embodiment.
Figure 5B:
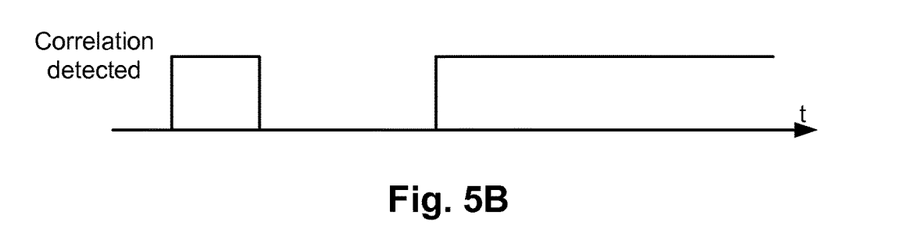

FIGS. 5A-5B illustrate the measurements associated with the correlation of PN codes, according to one embodiment. Once the timing data has been recovered and corrupted timestamps discarded, the sequence of timestamps can be compared against a time-stamped video stream to determine audio-video synchronization. For audio fidelity measurements, additional processing is performed. The raw timestamps provide an indication of how rapidly the audio stream is progressing, and if this time progression fails to match the advance of wall-clock time, then audio fidelity will be impacted. However, there can be situations where the audio stream is progressing at the correct rate, but large chunks of the stream are missing, replicated or corrupted. This too will have an adverse effect on audio fidelity and the user's audio experience. Accordingly, to gauge audio fidelity, several parameters in addition to the speed of the audio stream must be considered.

FIG. 5A describes how the correlation of the received signal is interpreted as a received PN code. In general, the correlation is given a score depending on how well the PN code is matched. For example, a perfect correlation receives a score of 255 and a perfect negative correlation receives a score of −255. A margin of values, also referred to as values within the threshold of correlated margin, around the maximum and minimum are provided, such that the system will interpret a positive or a negative correlation, although the correlation is not perfect. For all other values outside the margin areas around the maximum and minimum, a state of no match for the correlation is returned.

FIG. 5B shows a graph showing when correlation of the PN codes is detected at the receiving end. The amount of time that the correlation of the PN code is detected provides a first measurement of the quality of the received audio signal. To obtain a measure of quality when a code is detected, the correlation score is compared to the ideal correlation score (i.e., how close to 100% is the biased autocorrelation result). The lower the score, the more packets (and their corresponding audio samples) that have been lost, replicated or corrupted, or altered due to the effects of protocol compression. As noted before, given that a single PN code may span hundreds of audio samples, it is possible for a significant number of audio samples to be missing or corrupted and the code still recovered. Many VDI transport protocols respond to missing samples by replicating the samples from prior packets or just padding with zeros.

Figure 6A:
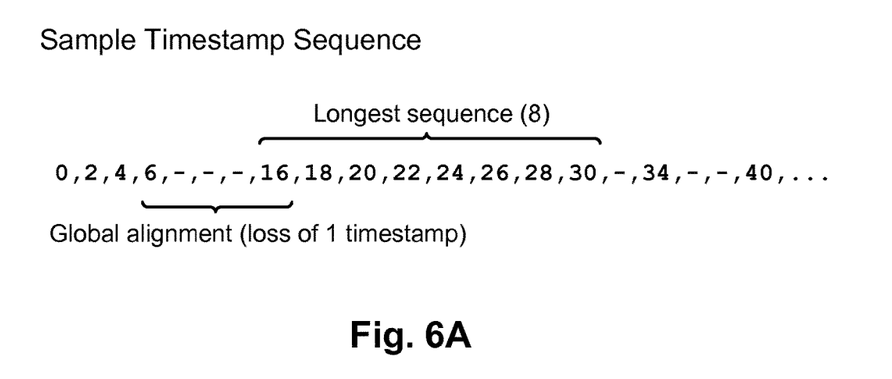
FIGS. 6A, 6B, and 6C illustrate different embodiments for the calculation of performance metrics.
Figure 6B:
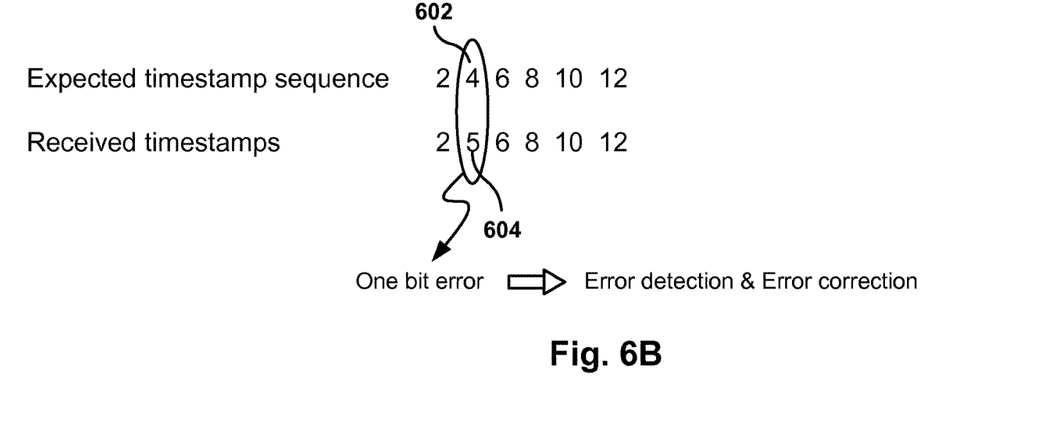
Figure 6C:
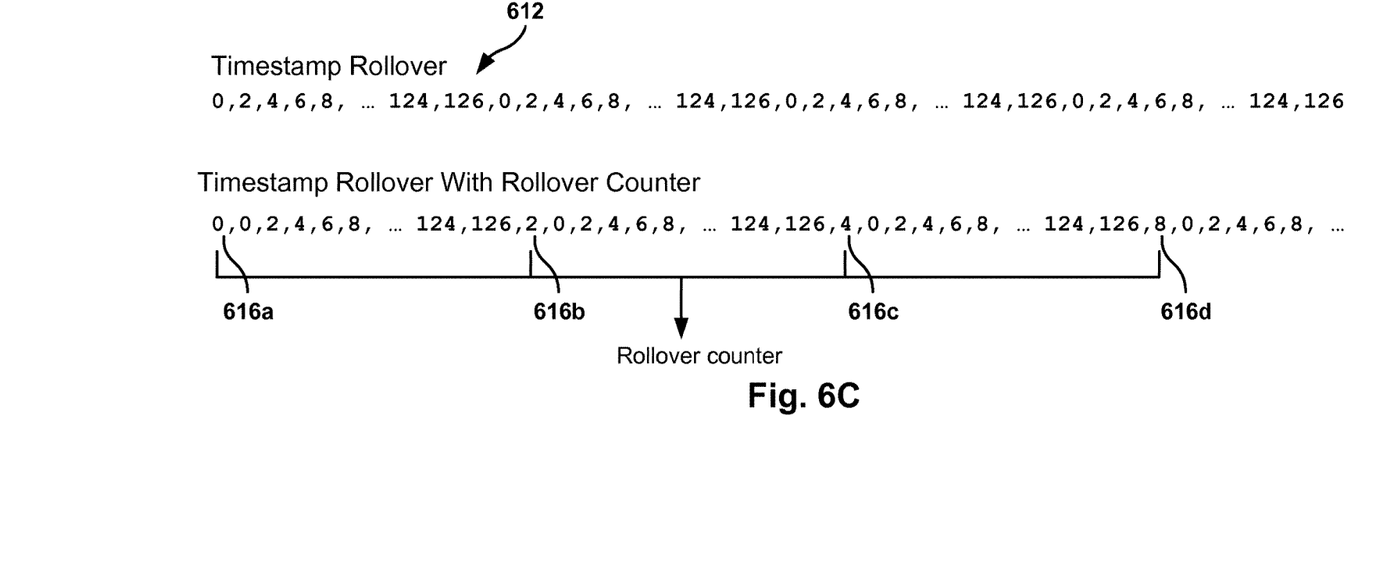

FIGS. 6A-6C illustrate different embodiments for the calculation of performance metrics. FIG. 6A shows a sequence of received and missing timestamps at the endpoint. The failure to detect a code means that the audio was missing, or that the audio was significantly corrupted during that portion of the audio stream. Due to the lack of timing synchronization between the host and endpoint device, and due to the lossy nature of the network, additional analysis is performed to recover the timestamps from the code. When the endpoint device examines the audio stream being played back to the user, this stream may have been subject to significant processing by the transport protocol. The local audio stream will continue to advance at the appropriate rate, even if the endpoint has stopped receiving audio from the host, if the endpoint is receiving at a significantly reduced rate or if packets are being dropped or arriving out of order. As a result, the endpoint's audio stream may not contain any PN codes during certain intervals.

It is necessary to continually check whether there is synchronization with the PN code. This is achieved by monitoring the result of the correlation operations performed as the analysis advances across each successive chunk (chunk size is the size of the PN code) of the audio stream. If the correlation result drops below the set threshold, synchronization is considered lost and it is necessary to resynchronize with the stream, as shown in FIG. 5B. Resynchronization can be achieved in a similar manner in which the initial synchronization was obtained.

To identify the impact of missing, corrupted or duplicated bits, a sequence of several adjacent timestamps are examined. If the sequence is, for example, monotonically increasing (assuming that the original timestamps monotonically increase), then it is highly likely that the timestamps are uncorrupted and are considered correct. The level of uncertainty can be managed by changing the number of timestamps evaluated. Additionally, it is possible to insert parity bits or EC codes to guard against corruption in a more traditional manner. FIG. 6A shows an example with a longest sequence of 8 consecutive timestamps (it is noted that the timestamps grow in increments of 2 because the least significant bit of the timestamp is fixed to 0).

Another measure of quality is based on a large timescale (i.e., the macro scale). The question is at which audio degradation becomes noticeable to humans, and how do all the various chunks of received audio reassemble the original stream. In this case it is necessary to consider the received audio stream in the broader context and attempt to determine how well the received samples fit together to provide something that resembles the original audio stream.

On a large scale measurement of quality, one method locates the longest local alignment (in the window of analysis, which is type a buffer's worth of data, e.g., a few seconds), and then attempts to extend the alignment across all of the available samples within the analysis window. Once this process is completed, the percentage of good samples is computed to obtain a measure of the end user's audio experience.

The maximum local alignment is obtained by scanning the recovered timestamps, and identifying the longest sequence of monotonically increasing timestamps. This represents the largest sequence of good quality, correctly-timed audio. In one embodiment, other non-contiguous groups of samples within the buffer may also be correctly timed with respect to the longest local match. These non-contiguous groups also contribute to the reconstruction of the audio stream, and the initial match can then be extended by including these other smaller groups of audio samples in the set of matching samples.

Further, small slips in synchronization may not be detectable by the human ear, and so it is possible to use these samples to further expand the set of matching samples. In this case, the degree to which each of the remaining timestamps in the analysis window is out of synchronization is considered. Where the lack of synchronization is less than a predefined threshold, the samples are also considered part of the match.

To measure audio-video synchronization on the endpoint device, it is necessary to determine which audio samples are being played on the endpoint device in parallel with which video frames. In essence, the problem is to identify is a given audio sample associated with a given video sample is the same match at the client as at the endpoint. There can be a dis-synchronization of 1 sample, 10 samples, 1000 samples, etc. A drift of as little as 100 ms can become noticeable to users. It should be noted that it is not possible to simply enhance the VDI transport protocols to provide this timing information, as there may be host CPU constraints that impact upstream (application) behavior in ways that are not apparent to the transport protocol. Further, it is desirable to have an analysis technique that works with existing protocols.

FIG. 6B illustrates a method for error correction. In one embodiment, error correction is performed on the received timestamps using EC codes or by analyzing the received sequence. For instance, if a sequences of 8 bits is observed, with the first and last bits being 1 and one or more of the intermediate bits set to 0, it is possible to infer that this is a corrupted demarcation marker (especially, if the correlation threshold is low for the flipped bit, and a demarcation marker is expected). Similarly, if a timestamp deviates from the monotonic cadence, but only differs from the expected value by a single bit, again it may be permissible to assume that the bit was flipped due to corruption. Depending on the mode of use, it may be desirable to correct these likely errors, tag them as single bit flips, or use them to aid resynchronization of the bit stream. In the example of FIG. 6B, a timestamp with a value of 5 is received between timestamps with values 2 and 6. Since the timestamps only include even numbers and the timestamp is located between samples 2 and 6, it is concluded that the value of 5 should have been a 4 and a timestamp is then corrected to the value of 4.

FIG. 6C illustrates the use of a rollover counter. Additionally, in the above example, given that each timestamp can only cover 6 bits of the allotted 8 bits, there are only 64 unique timestamp values available. If a timestamp is required each 100 ms, the timestamp repeat time is only about 6 seconds, which was deemed too short to catch all potential aliasing conditions during experimentation. As a result, it can be necessary to employ a two level timing system. For instance, the timestamp value of 0 can be overloaded such that, in addition to indicating that the audio stream has progressed by another 100 ms, it can also be used to provide information about how many times the timestamp sequence has repeated. When the timestamp sequence repeats, and the next expected timestamp is 0, it will instead be replaced by a non-zero value that indicates the number of repeats, or timer rollovers. Via this mechanism, many forms of aliasing can be detected within a 6 minute window. Given the fairly low repeat frequency of these values, parity protection or EC may be worthwhile, to catch, and potentially recover from, corruption. In the embodiment shown in FIG. 6C, an additional rollover counter is included at the beginning of each sequence, i.e., ahead of the timestamp with a value of 0.

In one embodiment, the several quality metrics are combined to create a single quality metric. As noted above, it is necessary to subjectively align the metric such that is closely reflects an end-user's audio experience (i.e. what is the value of the computed metric when the user regards the experience as excellent, good, acceptable, poor, bad and so on).

The embodiments previously described have been discussed with respect to audio being streamed from the host to the endpoint device. In another embodiment, the principles presented herein are applied to the case when the endpoint device inserts markers into its output stream (e.g., microphone, webcam streams), allowing the performance of the uplink from the endpoint to the host to be analyzed.

Figure 7:
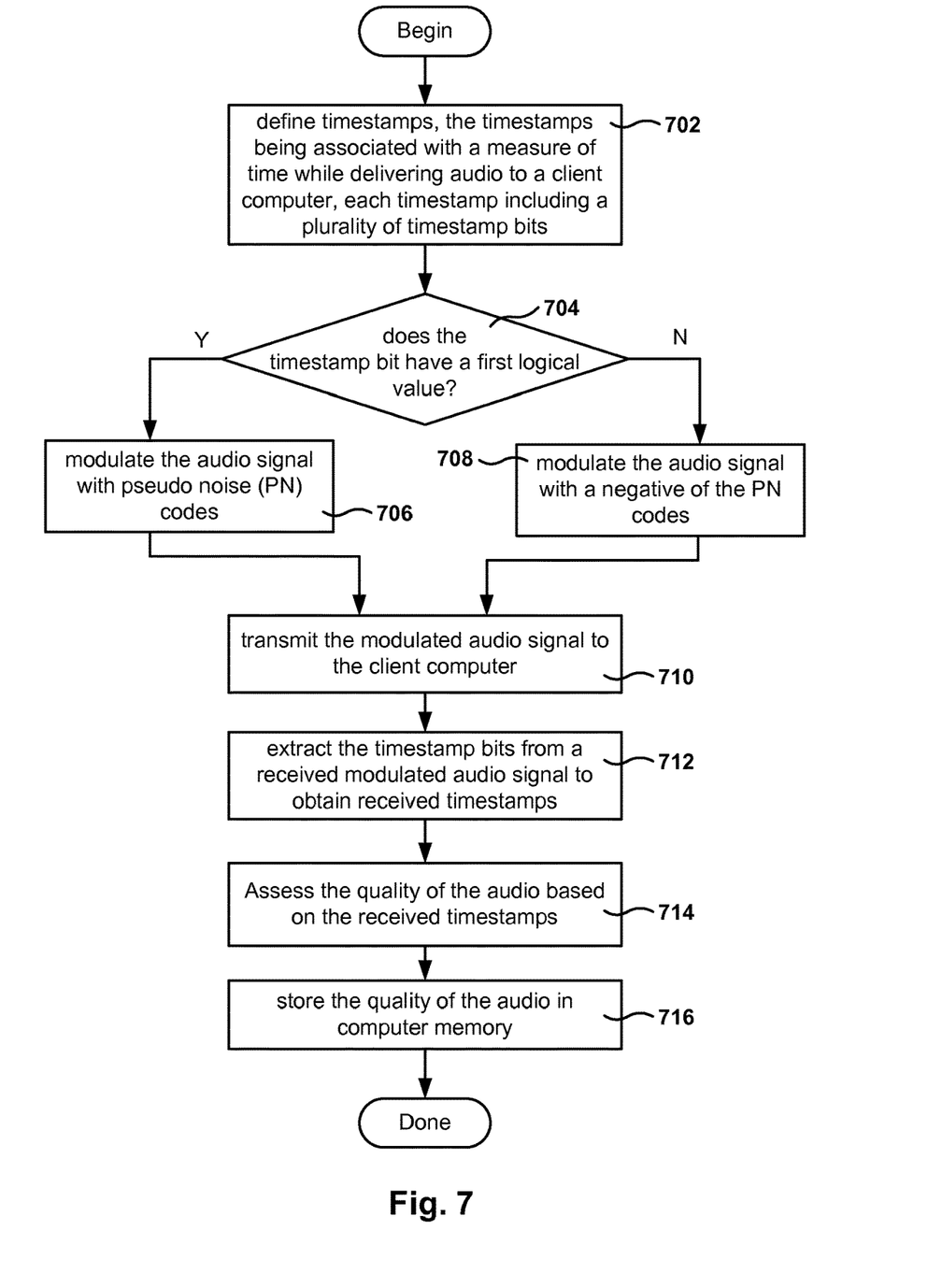
FIG. 7 shows the process flow of a method for monitoring quality of audio delivered over a communications channel.

FIG. 7 shows the process flow of a method for monitoring quality of audio delivered over a communications channel. In operation 702, timestamps are defined, where the timestamps are associated with a measure of time while delivering audio to a client computer. Each timestamp includes a plurality of timestamp bits. In operation 704, the method checks if the bit of the timestamp being transmitted has a first logical value. If the check determines that the timestamp bit has the first logical value, the method continues to operation 706, and to operation 708 otherwise. In operation 706, an audio signal is modulated with the positive version of the PN codes, and in operation 708 the audio signal is modulated with a negative version of the PN codes. From operation 706 or operation 708, the method continues to operation 710 for transmitting the modulated audio signal to the client computer.

In operation 712, the method extracts the timestamp bits from a received modulated audio signal to obtain received timestamps. From operation 712, the method continues to operation 714 to assess the quality of the audio received based on the received timestamps, and from operation 714 the method continues to operation 716 where the quality of the audio is stored in computer memory.

Figure 8:
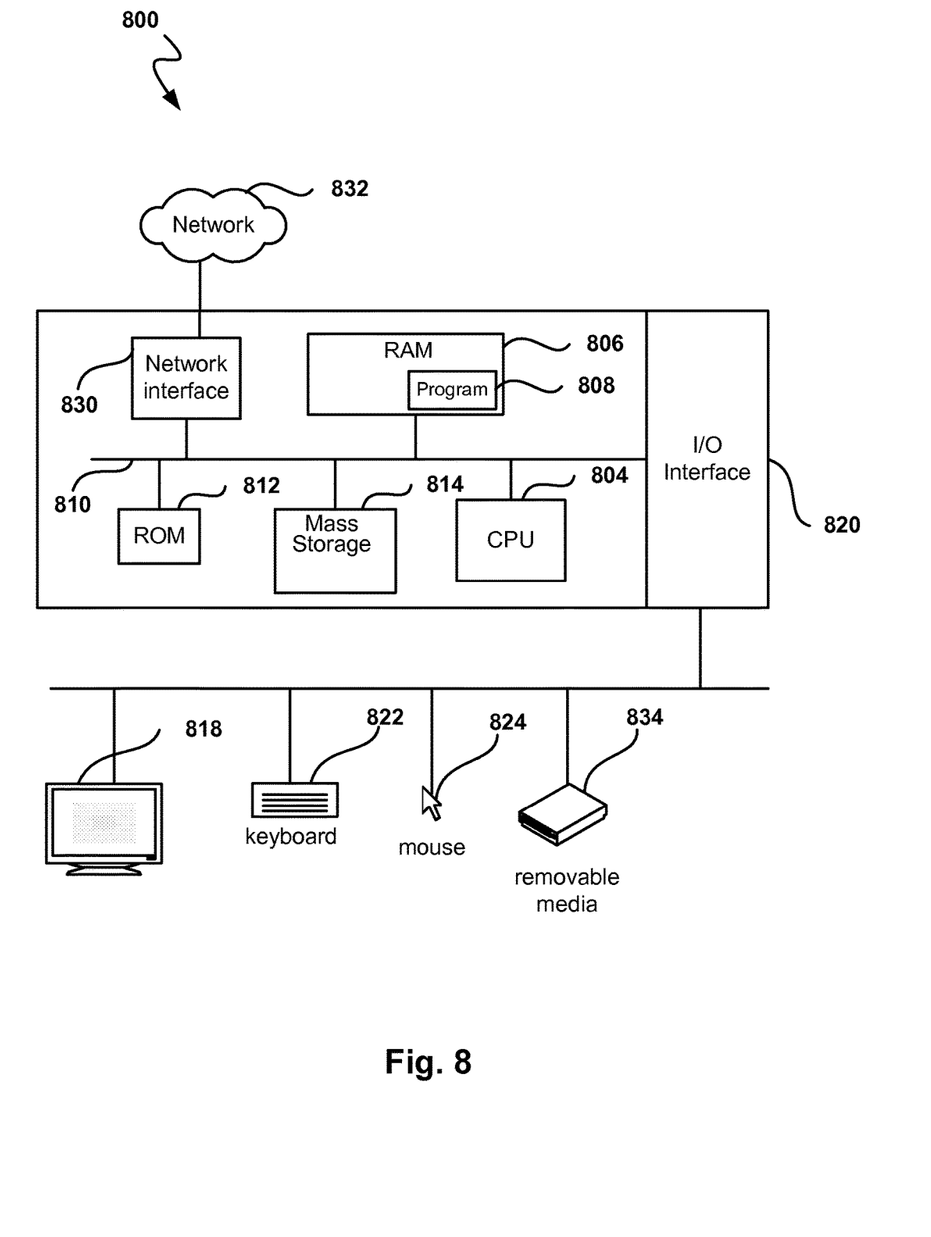
FIG. 8 is a simplified schematic diagram of a computer system for implementing embodiments of the present invention.

FIG. 8 is a simplified schematic diagram of a computer system for implementing embodiments of the present invention. It should be appreciated that the methods described herein may be performed with a digital processing system, such as a conventional, general-purpose computer system. Special purpose computers, which are designed or programmed to perform only one function may be used in the alternative. The computer system includes a central processing unit (CPU) 804, which is coupled through bus 810 to random access memory (RAM) 806, read-only memory (ROM) 812, and mass storage device 814. Performance agent program 808 resides in random access memory (RAM) 806, but can also reside in mass storage 814.

Mass storage device 814 represents a persistent data storage device such as a floppy disc drive or a fixed disc drive, which may be local or remote. Network interface 830 provides connections via network 832, allowing communications with other devices. It should be appreciated that CPU 804 may be embodied in a general-purpose processor, a special purpose processor, or a specially programmed logic device. Input/Output (I/O) interface provides communication with different peripherals and is connected with CPU 804, RAM 806, ROM 812, and mass storage device 814, through bus 810. Sample peripherals include display 818, keyboard 822, cursor control 824, removable media device 834, etc.

Display 818 is configured to display the user interfaces described herein. Keyboard 822, cursor control 824, removable media device 834, and other peripherals are coupled to I/O interface 820 in order to communicate information in command selections to CPU 804. It should be appreciated that data to and from external devices may be communicated through I/O interface 820. The invention can also be practiced in distributed computing environments where tasks are performed by remote processing devices that are linked through a wire-based or wireless network.

Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a network.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. The apparatus may be specially constructed for the required purpose, such as a special purpose computer. When defined as a special purpose computer, the computer can also perform other processing, program execution or routines that are not part of the special purpose, while still being capable of operating for the special purpose. Alternatively, the operations may be processed by a general purpose computer selectively activated or configured by one or more computer programs stored in the computer memory, cache, or obtained over a network. When data is obtained over a network the data maybe processed by other computers on the network, e.g., a cloud of computing resources.

The embodiments of the present invention can also be defined as a machine that transforms data from one state to another state. The transformed data can be saved to storage and then manipulated by a processor. The processor thus transforms the data from one thing to another. Still further, the methods can be processed by one or more machines or processors that can be connected over a network. The machines can also be virtualized to provide physical access to storage and processing power to one or more users, servers, or clients. Thus, the virtualized system should be considered a machine that can operate as one or more general purpose machines or be configured as a special purpose machine. Each machine, or virtual representation of a machine, can transform data from one state or thing to another, and can also process data, save data to storage, display the result, or communicate the result to another machine.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method comprising:
   determining, by one or more computers, a sequence of two or more timestamps, the timestamps being associated with a measure of time progress while delivering audio to a client computer, each timestamp in the sequence of two or more timestamps including a plurality of timestamp bits;
   modulating an audio signal with the sequence of two or more timestamps, wherein modulating the audio signal for each timestamp comprises:
      modulating a carrier signal for each timestamp bit of the timestamp with an instance of a k-bit encoding of length k that spreads the encoding over a plurality of audio samples, wherein each instance of the k-bit encoding is a positive version that positively correlates with the k-bit encoding or negative version that negatively correlates with the k-bit encoding based on the binary value of that particular timestamp bit; and adding the modulated carrier signal to the audio signal;

transmitting the modulated audio signal to a client computer; and determining a quality value of the audio based on the two or more timestamps received by the client computer, wherein the two or more timestamps are obtained using the timestamp bits extracted by the client computer from the received modulated audio signal.

2. The method of claim 1, wherein the modulation of the audio signal is a positive value of pseudo noise (PN) codes when a timestamp bit has a first logical value and is a negative value of the PN codes when the timestamp bit has a second logical value.

3. The method of claim 2, wherein modulating the audio signal comprises:

modulating a digital carrier with the PN codes or with the negative of the PN codes to obtain a digital modulated PN signal; and combining the digital modulated PN signal with a digital form of the audio signal to obtain the modulated audio signal.

4. The method of claim 1, wherein each timestamp includes a counter and a marker, the marker indicative of a location of the timestamp, the counter indicative of a place of each timestamp within the sequence of two or more timestamps.

5. The method of claim 4, wherein the extraction of the timestamp bits by the client computer includes:

detecting the marker; and determining a value of the counter based on the detecting of the marker.

6. The method of claim 1, comprising:

inserting video markers in a video signal associated with the audio signal;

transmitting the video signal with the modulated audio signal;

receiving information associated with the reception of the video markers;

correlating a reception of timestamps in the modulated audio signal and a reception of video markers in the transmitted video signal; and determining a synchronization between the audio signal and the video signal based on the correlating.

7. The method of claim 1, wherein determining the quality value further includes:

comparing time progress of the received modulated audio signal with progress of the received timestamps; and determining the quality value based on a synchronism between the received modulated audio signal and the progress of the received timestamps.

8. A method comprising:

receiving a modulated audio signal at a client computer, wherein the modulated audio signal is modulated with a sequence of two or more timestamps, the timestamps being associated with a measure of time progress while delivering audio to the client computer, each timestamp including a plurality of timestamp bits, wherein the audio signal is modulated for each timestamp bit with an instance of a k-bit encoding of length k that spreads the encoding over a plurality of audio samples, wherein each instance of the k-bit encoding is a positive version that positively correlates with the k-bit encoding or negative version that negatively correlates with the k-bit encoding based on the binary value of that particular timestamp bit;

extracting the timestamp bits from the received modulated audio signal to obtain two or more received timestamps; and determining a quality value of the audio based on the two or more received timestamps.

9. The method of claim 8, wherein the modulated audio signal is a positive value of pseudo noise (PN) codes when a timestamp bit has a first logical value and is a negative value of the PN codes when the timestamp bit has a second logical value.

10. The method of claim 9, wherein extracting the timestamp bits for each timestamp comprises:

detecting a correlation on the received modulated audio signal to determine if the positive value of the PN code or the negative value of the PN code is received, wherein detecting a positive correlation with the PN code is interpreted as a timestamp bit with the first logical value and detecting a negative correlation with the PN code is interpreted as a timestamp bit with the second logical value.

11. The method of claim 9, wherein determining the quality value of the audio comprises determining the quality value of the audio based on the received timestamps and a quality of a received PN code in the modulated audio signal.

12. The method of claim 8, comprising:

receiving a video signal associated with the received modulated audio signal, the video signal including a plurality of video markers; and determining a synchronization between the received audio signal and the video signal based on a correlation between the two or more received timestamps and the plurality of video markers.

13. The method of claim 8, further comprising:

providing the quality value to a server.

14. The method of claim 8, wherein each timestamp includes a counter and a marker, the marker indicative of a location of the timestamp, the counter indicative of a place of each timestamp within the sequence of two or more timestamps, and wherein extracting the timestamp bits further includes:

detecting the marker; and determining a value of the counter based on the detecting of the marker.

15. The method of claim 14, wherein the marker is a logical value including a plurality of logical 1 bits, wherein the counter begins and ends with a logical 0 bit.

16. The method of claim 8, wherein determining the quality value further includes:

comparing time progress of the received modulated audio signal with progress of the received timestamps; and determining the quality value based on a synchronism between the received modulated audio signal and the progress of the received timestamps.

17. The method of claim 8, wherein determining the quality value further includes measuring a longest sequence of consecutive timestamps extracted during a period of time.

18. A method comprising:

receiving a modulated audio signal at a client computer, wherein the modulated audio signal is modulated with a sequence of two or more timestamps, the timestamps being associated with a measure of time progress while delivering audio to the client computer, each timestamp including a plurality of timestamp bits, wherein the audio signal is modulated for each timestamp bit with an instance of a k-bit encoding of length k that spreads the encoding over a plurality of audio samples, wherein each instance of the k-bit encoding is a positive version that positively correlates with the k-bit encoding or negative version that negatively correlates with the k-bit encoding based on the binary value of that particular timestamp bit;

receiving a video signal associated with the received modulated audio signal, the video signal including a plurality of video markers;

extracting the timestamp bits from the received modulated audio signal to obtain two or more received timestamps, wherein extracting the timestamp bits for each timestamp include:

detecting a correlation on the received modulated audio signal to determine if the positive value of the k-bit encoding or the negative value of the k-bit encoding is received, wherein determining a positive correlation with the k-bit encoding is interpreted as a timestamp bit with the first logical value and determining a negative correlation with the k-bit encoding is interpreted as a timestamp bit with the second logical value; and determining a synchronization between the received audio signal and the video signal based on a correlation between the two or more received timestamps and the plurality of video markers.

19. One or more non-transitory computer-readable storage media encoded with instructions that, when executed by one or more computers, cause the one or more computers to perform operations comprising:

determining, by one or more computers, a sequence of two or more timestamps, the timestamps being associated with a measure of time progress while delivering audio to a client computer, each timestamp in the sequence of two or more timestamps including a plurality of timestamp bits;

modulating an audio signal with the sequence of two or more timestamps, wherein modulating the audio signal for each timestamp comprises:

modulating a carrier signal for each timestamp bit of the timestamp with an instance of a k-bit encoding of length k that spreads the encoding over a plurality of audio samples, wherein each instance of the k-bit encoding is a positive version that positively correlates with the k-bit encoding or negative version that negatively correlates with the k-bit encoding based on the binary value of that particular timestamp bit, and     adding the modulated carrier signal to the audio signal;

transmitting the modulated audio signal to a client computer; and determining a quality value of the audio based on the two or more timestamps received by the client computer, wherein the two or more timestamps are obtained using the timestamp bits extracted by the client computer from the received modulated audio signal.

20. One or more non-transitory computer-readable storage media encoded with instructions that, when executed by one or more computers, cause the one or more computers to perform operations comprising:

receiving a modulated audio signal at a client computer, wherein the modulated audio signal is modulated with a sequence of two or more timestamps, the timestamps being associated with a measure of time progress while delivering audio to the client computer, each timestamp including a plurality of timestamp bits, wherein the audio signal is modulated for each timestamp bit with an instance of a k-bit encoding of length k that spreads the encoding over a plurality of audio samples, wherein each instance of the k-bit encoding is a positive version that positively correlates with the k-bit encoding or negative version that negatively correlates with the k-bit encoding based on the binary value of that particular timestamp bit;

extracting the timestamp bits from the received modulated audio signal to obtain two or more received timestamps; and determining a quality value of the audio based on the two or more received timestamps.

21. A system comprising:

one or more computers and one or more storage devices storing instructions that are operable, when executed by the one or more computers, to cause the one or more computers to perform operations comprising:

determining, by one or more computers, a sequence of two or more timestamps, the timestamps being associated with a measure of time progress while delivering audio to a client computer, each timestamp in the sequence of two or more timestamps including a plurality of timestamp bits;

modulating an audio signal with the sequence of two or more timestamps, wherein modulating the audio signal for each timestamp comprises:

modulating a carrier signal for each timestamp bit of the timestamp with an instance of a k-bit encoding of length k that spreads the encoding over a plurality of audio samples, wherein each instance of the k-bit encoding is a positive version that positively correlates with the k-bit encoding or negative version that negatively correlates with the k-bit encoding based on the binary value of that particular timestamp bit, and     adding the modulated carrier signal to the audio signal;

transmitting the modulated audio signal to a client computer; and determining a quality value of the audio based on the two or more timestamps received by the client computer, wherein the two or more timestamps are obtained using the timestamp bits extracted by the client computer from the received modulated audio signal.

22. A system comprising:

one or more computers and one or more storage devices storing instructions that are operable, when executed by the one or more computers, to cause the one or more computers to perform operations comprising:

receiving a modulated audio signal at a client computer, wherein the modulated audio signal is modulated with a sequence of two or more timestamps, the timestamps being associated with a measure of time progress while delivering audio to the client computer, each timestamp including a plurality of timestamp bits, wherein the audio signal is modulated for each timestamp bit with an instance of a k-bit encoding of length k that spreads the encoding over a plurality of audio samples, wherein each instance of the k-bit encoding is a positive version that positively correlates with the k-bit encoding or negative version that negatively correlates with the k-bit encoding based on the binary value of that particular timestamp bit;

extracting the timestamp bits from the received modulated audio signal to obtain two or more received timestamps; and determining a quality value of the audio based on the two or more received timestamps.

* * * * *